United States Patent
Wong

(10) Patent No.: US 6,959,872 B2
(45) Date of Patent: Nov. 1, 2005

(54) MULTI-PURPOSE MEMORY CARDHOLDER

(76) Inventor: Huei-Chen Wong, PO Box 82-144, Taipei (TW)

( * ) Notice: Subject to any disclaimer, the term of this patent is extended or adjusted under 35 U.S.C. 154(b) by 0 days.

(21) Appl. No.: 10/815,725

(22) Filed: Apr. 2, 2004

(65) Prior Publication Data

US 2005/0218232 A1    Oct. 6, 2005

(51) Int. Cl.[7] .............................................. G06K 7/00
(52) U.S. Cl. ...................... 235/486; 235/435; 235/439
(58) Field of Search ............................... 235/451, 486, 235/487, 492, 435, 439; 439/630, 638, 687, 439/696

(56) References Cited

U.S. PATENT DOCUMENTS

| | | | |
|---|---|---|---|
| 6,612,492 B1 * | 9/2003 | Yen | 235/451 |
| 6,672,904 B1 * | 1/2004 | Chen | 439/631 |
| 6,688,521 B2 * | 2/2004 | Cheng | 235/451 |
| 6,716,066 B1 * | 4/2004 | Kuo | 439/630 |
| 6,776,653 B1 * | 8/2004 | Hsiao | 439/541.5 |
| 6,835,100 B1 * | 12/2004 | Chen | 439/630 |
| 2004/0064619 A1 * | 4/2004 | Liu et al. | 710/301 |

* cited by examiner

*Primary Examiner*—Daniel Stcyr
*Assistant Examiner*—April Taylor
(74) *Attorney, Agent, or Firm*—Leong C. Lei

(57) ABSTRACT

A T-shaped member multi-purpose memory cardholder includes slots on one end of the cardholder to respectively receive insertion by SD Card, MS Card, SM Card and MM Card adapted to spring plates or terminals inside the cardholder; the cardholder being made axially longer where the slot is provided; a concave being formed at the center; a contact for XD Card being provided at the bottom of the concave slot; one end of the XD card being inserted through the slot to incorporated with the contact in forming a five-in-one memory cardholder.

5 Claims, 10 Drawing Sheets

US 6,959,872 B2

MULTI-PURPOSE MEMORY CARDHOLDER

BACKGROUND OF THE INVENTION (a) Technical Field of the Invention

The present invention is related to a multi-purpose memory cardholder, and more particularly to a five-in-one memory cardholder that allows convenience in use, and smooth, safe and assured contacts between memory cards.

(b) Description of the Prior Art

Whereas the compact memory card is a common electronic part particularly used in precision electronic products including Note Book, digital camera, and PDA. To facilitate its use and save space, four-in-one memory card has been generally available in the market for the cardholder. The holder supplies the insertion and use of SD (SD Card), Memory Stick Card (MS Card), Smart Media Card (SM Card) and Multi Media Card (MM Card), and that is at the same time the extreme for the memory cardholder. However, XD Card has not yet been included.

Other defects are found in the design of four-in-one memory cardholder as illustrated in FIG. 9 of the accompanying drawings. A spring plate (81) used to contact SM Card provided on the inner side of a holder (80) of the prior art is fixed at one end while the other end disposed at a mild inclination due to limited space. A segment protrusion (810) is formed at the terminal of the spring plate (81) to facilitate contacting the SM Card. However, after repeated rounds of insertion or removal, the spring plate is vulnerable to elasticity fatigue.

Another defect comes from that an L-shape spring plate (82) used to contact the SM Card usually get too short, has poor elasticity and is harder to scratch the SM Card.

Referring to FIG. 10 for a side view of a structure of the cardholder (80) of the prior art. An arch (930) is formed directly at the end of a terminal (83) used to contact an MS Card (90). When the MS Card (90) is pushed against to conduct a contact provided at the bottom of the MS Card (90). However, the end of the terminal (83) at the arch (930) can be easily damaged when the top end of the MS Card (90) holds against the arch (930). Furthermore, as the write-proof terminal used to contact the MS Card is usually connected on the same line with the terminal used to contact the power supply, poor contact is found either at the write-proof terminal or the power supply contact terminal.

SUMMARY OF THE INVENTION

The primary purpose of the present invention is to provide a five-in-one memory cardholder to include the XD card without consuming too much space for more convenient in use and more powerful functions. To achieve the purpose, the end of slot of the holder of the present invention is slightly extended and a concave is formed inwardly at the extension to provide the contact for the XD card at the bottom of the concave, thus to forthwith hold the XD card in position.

Another purpose of the present invention is to provide a five-in-one memory cardholder with an improved structure for multiple spring plates or terminals adapted to their relative memory cards inside the holder, thus to achieve safer, more smooth and assured contacts with those memory cards.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
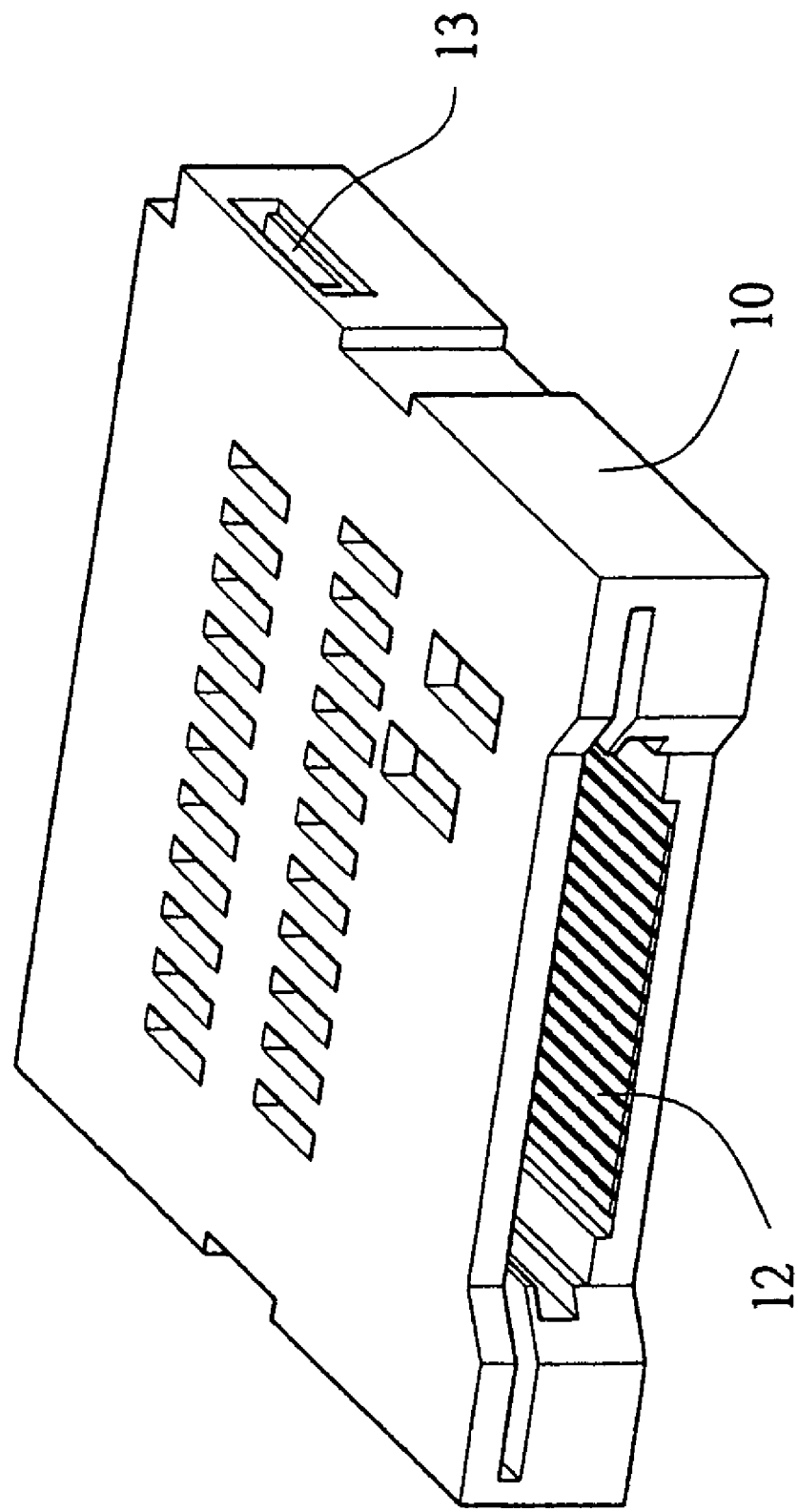
FIG. 1 is a view showing the appearance of the structure of the present invention.
Figure 3:
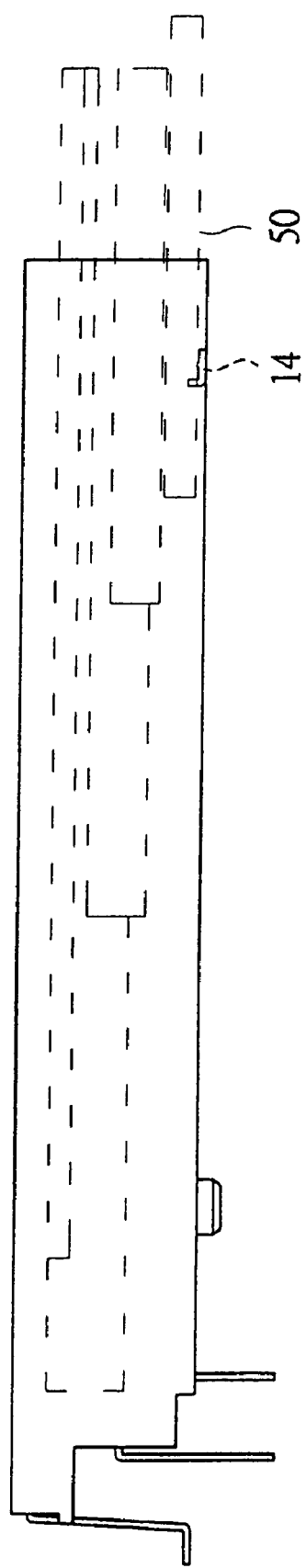
FIG. 3 is a side view of the present invention.
Figure 8:
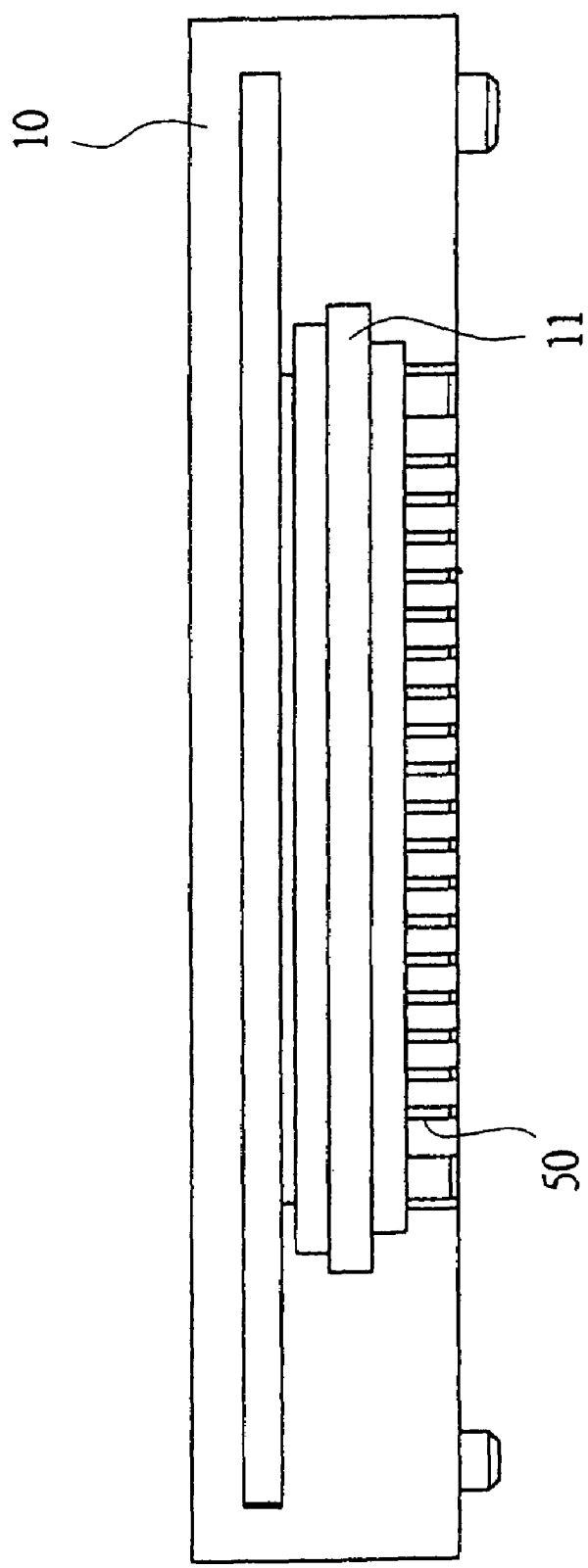
FIG. 8 is an end-view of the front slot of the present invention.
Figure 9:
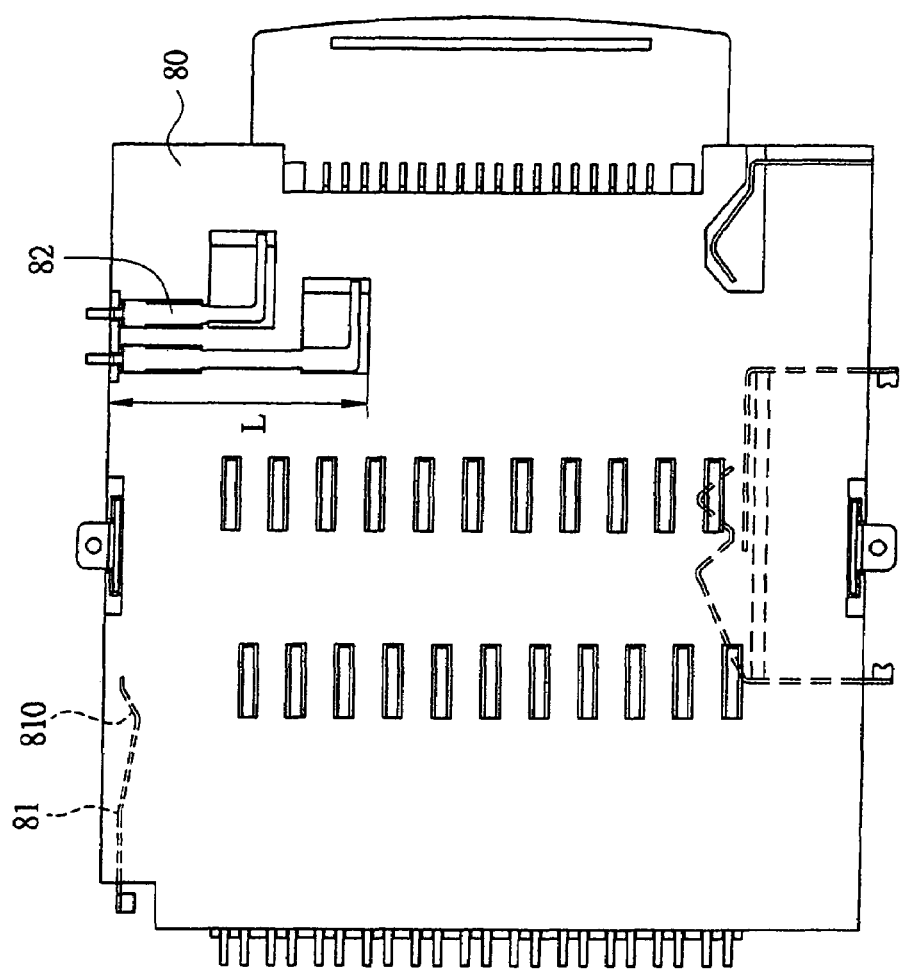
FIG. 9 is a bird's view of the prior art as assembled.
Figure 10:
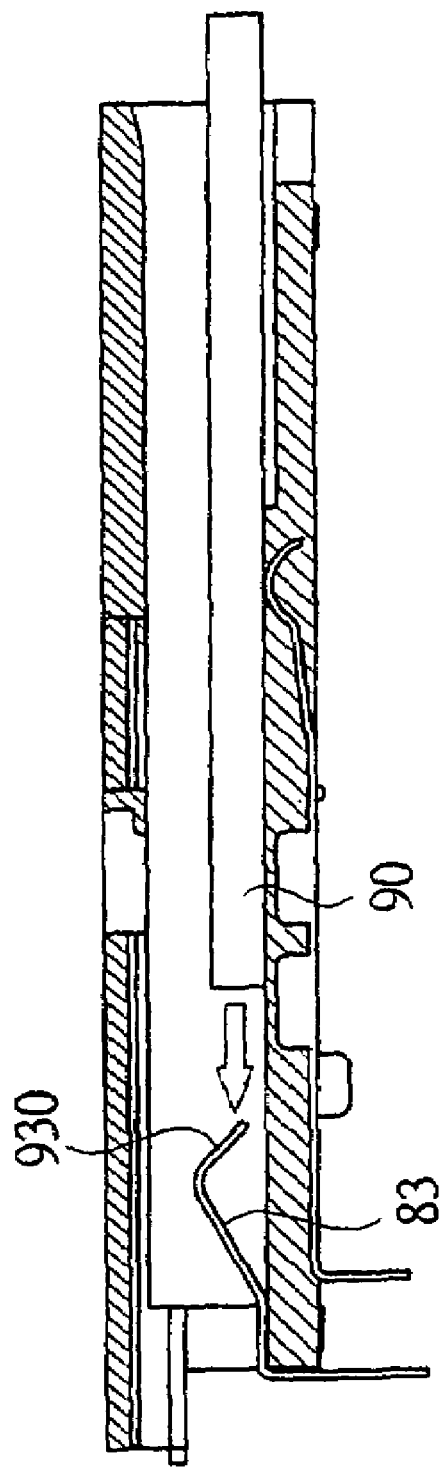
FIG. 10 is a side view of the prior art.

Referring to FIGS. 1, 3 and 8, a cardholder (10) of the present invention having provided at its one end multiple slots to respectively receive insertions by SD Card, MS Card (61), SM Card (62), and MM Card adapted to multiple internal spring plates (20) (21) (30) (70) (71) or a terminal (40) is characterized by that the slot (11) of the cardholder (10) is axially made longer than the prior art. A concave is formed at the center of the slot (11) and a contact (14) for an XD card (50) is provided at the bottom of the slot (11) at the concave. One end of the XD Card is inserted from the slot (11) to incorporate with the contact (14) for the cardholder (10) to become a five-in-one extra powerful memory cardholder.

Figure 2:
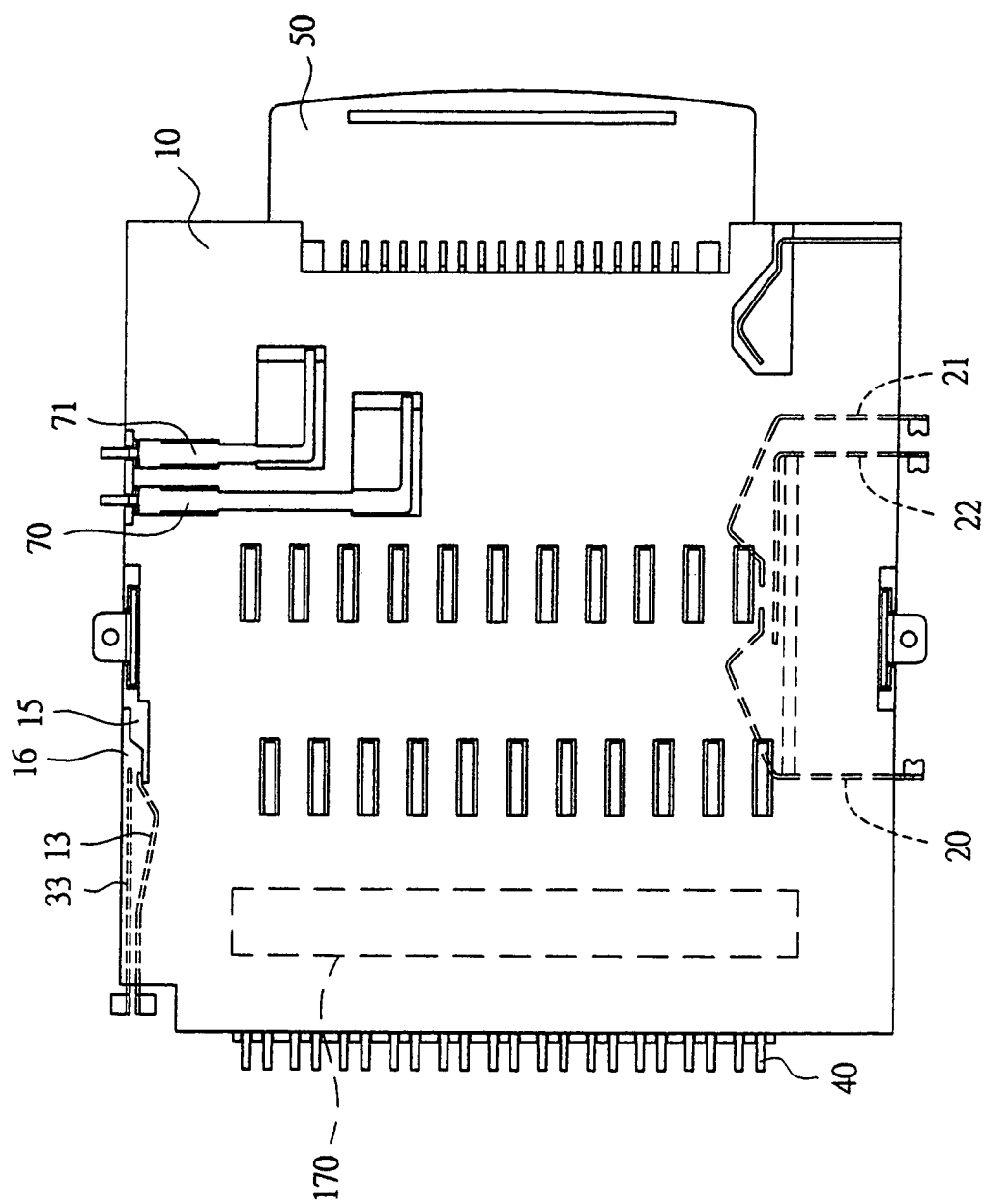
FIG. 2 is a bird's view of the present invention as assembled.
Figure 4:
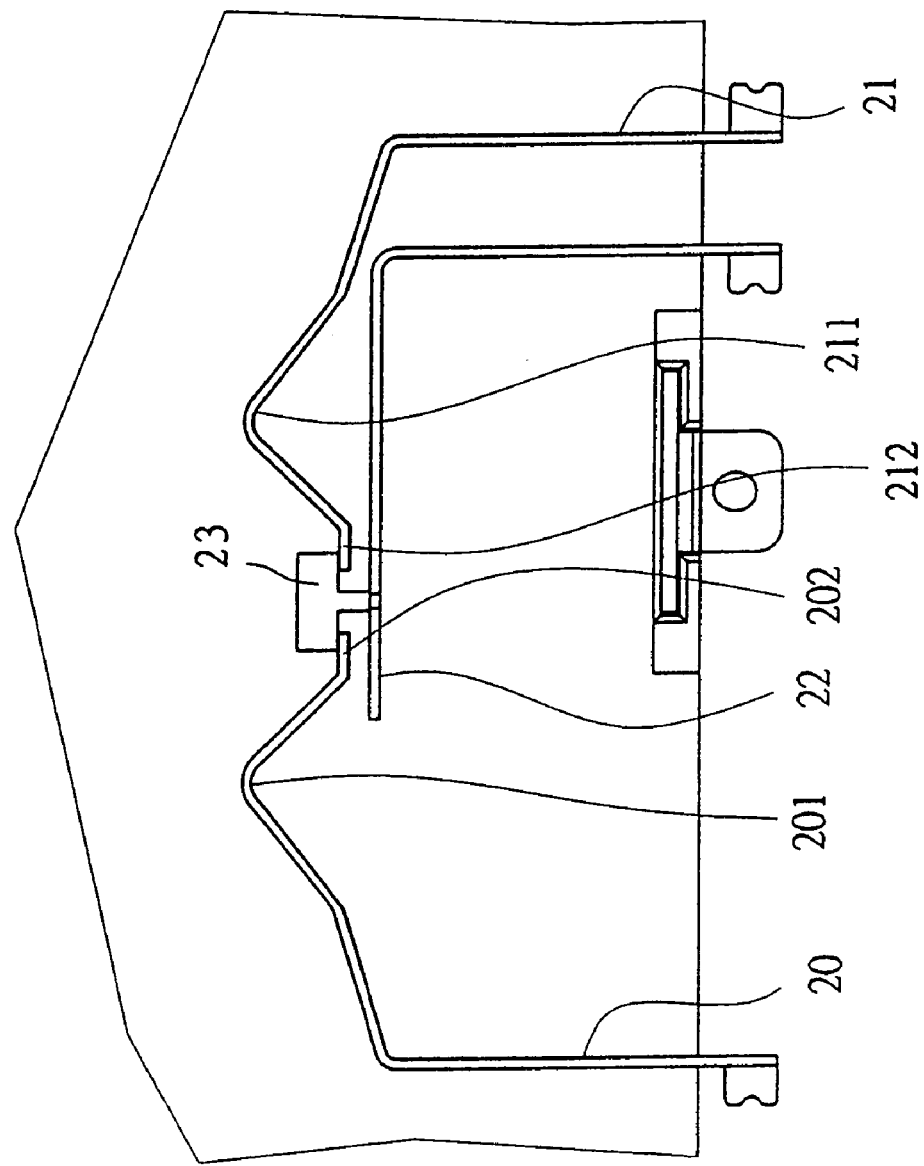
FIG. 4 is a schematic view showing the local structure of the plug-in location of an SD card of the present invention.

As illustrated in FIGS. 2 and 4, where between two write-proof spring plates (20)(21) provided to contact the XD card (60) on the inner side of the cardholder (10) and a source base plate (22) is constructed to such extent that the source base plate (22) is folded at a right angle with the horizontal end approximately at its center or where close to the open end fixed with a T-shape member (23); two write-proof spring plates (20) (21) are arranged parallel with the source base plate (22) with their terminals (202) (212) respectively of two protrusions (201) (211) of the contact extending into where between those protrusions from both sides of the T-shape member (23). Once the SD card is inserted to compress those two protrusions (201) (211) of both spring plates (20) (21) to secure the conduction by contacting the source base plate (22) for avoiding any malfunction.

Figure 5:
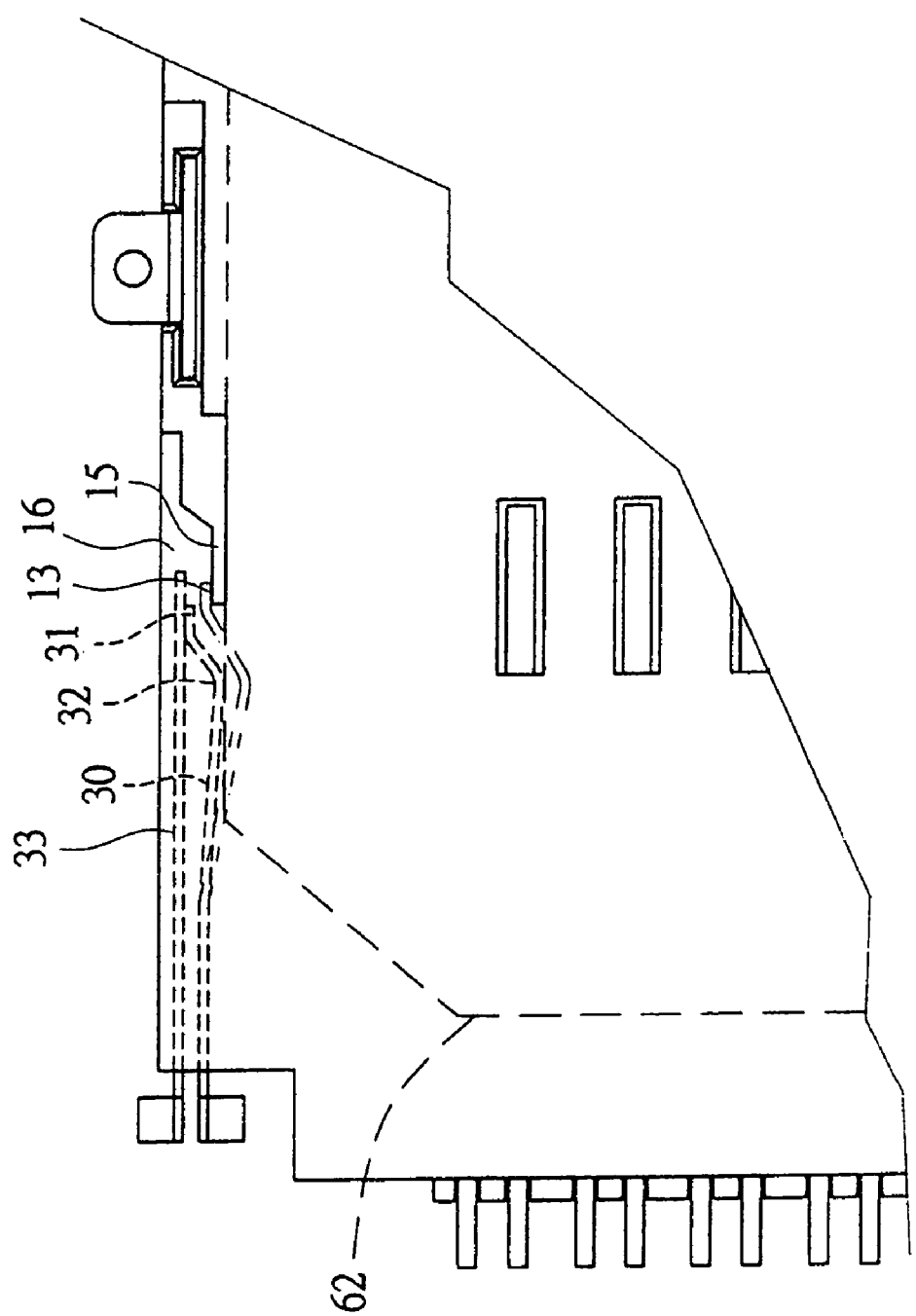
FIG. 5 is a schematic view showing the local structure of the plug-in location of an SM card of the present invention.

As illustrated in FIGS. 1, 2, and 5, on the other side inside the cardholder (10) for the contact by the SM Card (62), a through hole (13) is disposed, and at where slightly in the front of the through hole (13) a base plate (33) and a spring plate (30) are respectively provided. One end of the spring plate (30) is fixed to the cardholder (10) and an angle with a larger curvature is provided at the center of the spring plate (30). A terminal (32) of the spring plate (30) extends into an accommodation chamber (16) so that the spring plate (30) is given with the elasticity constantly compressing inwardly. A bump (31) is formed in the direction facing the SM Card (62) at the center section of the spring plate (30) so that when the SM Card (62) is pushed in, it pushes against the bump (31) for the spring plate (30) to conduct by contacting the base plate (33) while the through hole (13) on the side of the cardholder (10) provides the space for releasing the pressure when the spring plate (30) or the base plate (33) is pushed out.

The accommodation chamber (16) is defined by a retainer (15) in inverse L shape provided in the front of the terminal of the spring plate (30).

Figure 6:
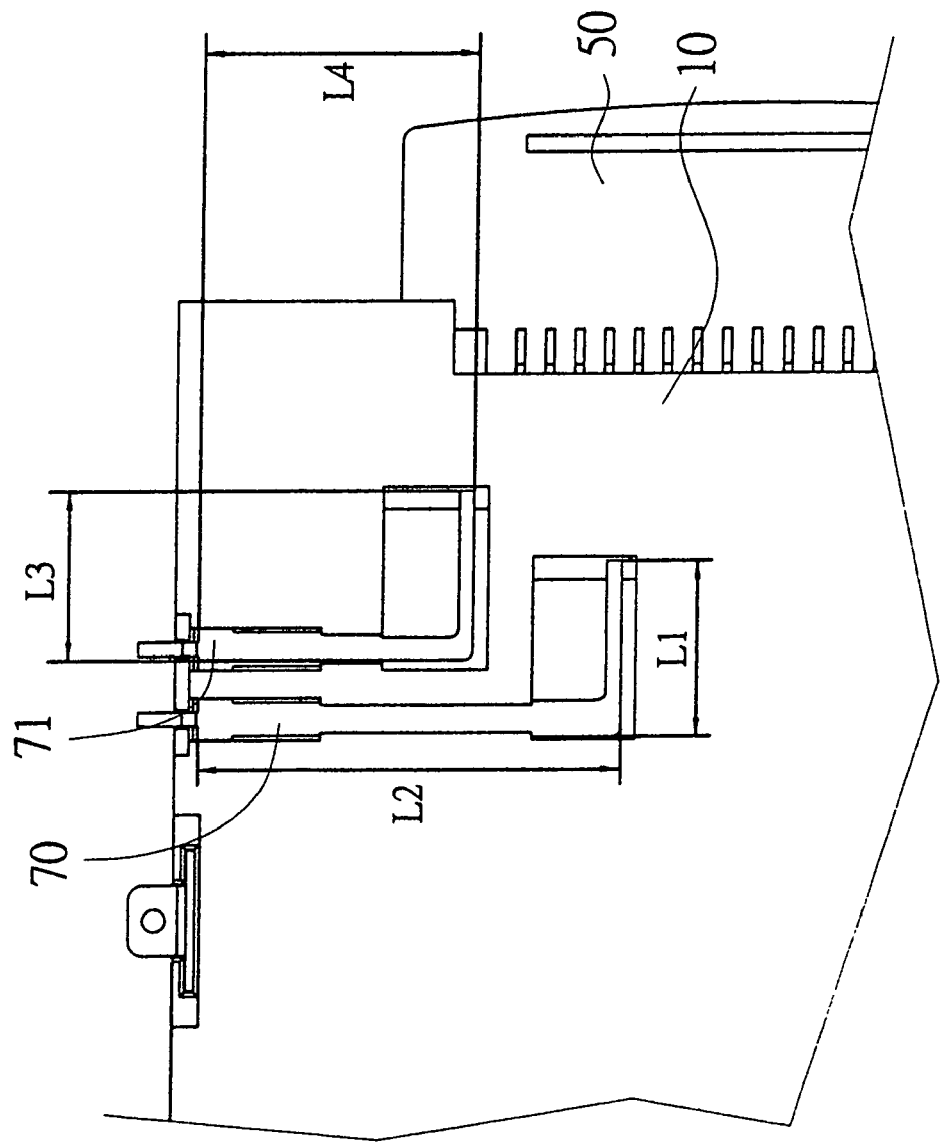
FIG. 6 is a view showing the structure at the location of the SM card R/W proof spring arm.

Now referring to FIG. 6, two R/W proof contact spring plates (70) (71) used to contact the SM Card (62) are each formed in L-shape with the length of the longer sides (L2) (L4) respectively 10.85 mm and 5.86 mm; the shorter sides (L1) (L3), 4.71 mm and 4.36 mm. The longer arm with proper elasticity prevents from scratching the SM card (62).

Figure 7:
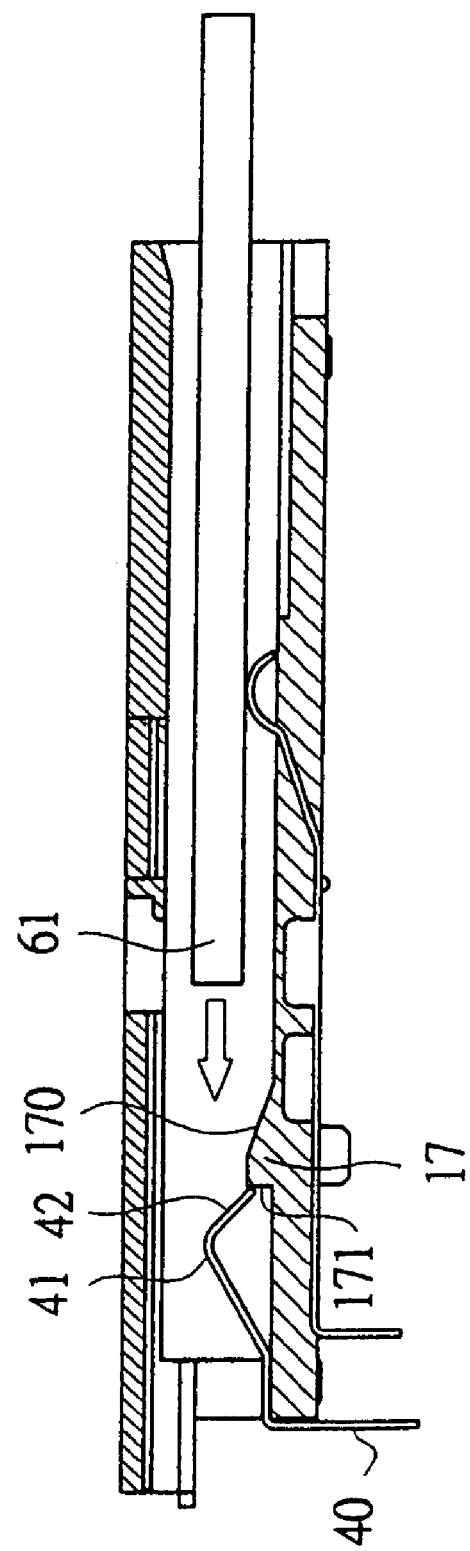
FIG. 7 is a schematic view showing the structure of the location at the MS card terminal.

As illustrated in FIGS. 2, 3, and 7, a terminal (40) extends from one end of the cardholder (10). Inside the terminal (40) a bump (41) to contact the MS Card (61) is formed, and a wedge (17) protrudes from the end (42) of the bump (41) with the slope (170) of the wedge (17) facing the slot (11) while a vertical wall (171) in the opposite direction merely functions as a stopper for the end (42) of the bump (41) to hold the terminal (40) in position. On the other hand, when the MS Card (61) is pushed in from the slope (170), it is easier for the MS Card (61) to be pushed to where above the bump (41) of the terminal (40) and prevented from being inserted below the bump (41) to better secure the contact.

The present invention offers the following advantages:
1. As a contact for XD Card is provided at the bottom in front of the slot of the cardholder of the present invention, incorporation with the XD Card is made possible in conjunction with the existing function of accommodating four types of memory cards to become a five-in-one extra powerful memory cardholder by permitting more convenient functions in practical use.
2. Separate contacts are used between the source plate and two write-proof spring plates used to contact the SD Card in the cardholder of the present invention. Upon inserting the SD Card, both spring plates are securely and respectively compressed to contact and conduct with the source plate to prevent malfunction.
3. A retainer and a through hole are additionally provided on the location of the SM Card to allow accommodation of or extension for releasing pressure by the spring plate and the base plate to avoid damage of the card during the pull or plug.
4. A protruded wedge is provided to the end of the terminal inside the cardholder with the slope facing the slot and the vertical wall to retain the terminal in position. When the MS card is pushed into on the slope, the wedge permits easier contact between the MS Card and the terminal without damaging the terminal.
5. The R/W proof spring plate to contact the SM Card in the present invention is provided with a longer arm of proper elasticity to prevent scratching the SM Card.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi-purpose memory cardholder having one end provided with slots to respectively receive the insertion of SD Card, MS Card, SM Card and MM Card adapted to spring plates or terminals inside the cardholder; the cardholder being made axially longer at where the slot is provided; a concave being formed at the center; a contact for XD Card being provided at the bottom of the concave slot; and one end of the XD card being inserted through the slot to incorporated with the contact in forming a five-in-one memory cardholder, wherein, two write-proof spring plates and a source base plate are provided inside the cardholder; the source base plate is folded at a right angle; a horizontal end of the source base plate is fixed with a T-shape member approximately at the center or the end; both write-proof spring plates are arranged in parallel with and in relation to the source base plate; a protruded end of the contact extends into where between both protruded sides of the T-shape member and the source base plate; and the insertion of the SD card compresses the protrusions of both spring plates to contact and conduct with the source base plate.

2. The multi-purpose memory cardholder as claimed in claim 1, wherein, a through hole is provided by the contact for the SM Card in the cardholder, a base plate and a spring plate are respectively provided in front of the through hole; one end of the spring plate is fixed to the cardholder; an angle at a greater curvature is formed at the middle section of the spring plate; the end of the spring plate extends into an accommodation chamber to provide consistent and inwardly compression elasticity; and a bump is formed at the middle section of the spring plate facing the direction of the SM Card; and the bump is pushed for the spring plate to contact and conduct with the base plate.

3. The multi-purpose memory cardholder as claimed in claim 1, wherein, an accommodation chamber is surrounded by an inverse L-shape retainer provided on an inner wall of the cardholder at where close to the front of the spring plate.

4. The multi-purpose memory cardholder as claimed in claim 1, wherein, a terminal extends from one end of the cardholder, a bump formed in the terminal to contact the MS Card; a wedge protruding from the end of the bump with a slope of the wedge facing the slot; and a vertical wall in the opposite direction merely serving as a retainer for the end of the bump.

5. The multi-purpose memory cardholder as claimed in claim 1, wherein, an R/W proof contact spring plate to contact the SM Card is made in an L-shape with a longer side in length ranging between 5.86 mm and 10.85 mm; and a shorter side, 4.36 mm and 4.71 mm as a minimum.

* * * * *